US012722567B2

(12) United States Patent
Kumazaki

(10) Patent No.: US 12,722,567 B2
(45) Date of Patent: Sep. 1, 2026

(54) RIDE SUPPORT DEVICE, METHOD, AND COMPUTER PROGRAM FOR SUPPORTING RIDE

(71) Applicant: TOYOTA JIDOSHA KABUSHIKI KAISHA, Toyota (JP)

(72) Inventor: Kenta Kumazaki, Bunkyo-ku Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 18/973,180

(22) Filed: Dec. 9, 2024

(65) Prior Publication Data

US 2025/0187536 A1 Jun. 12, 2025

(30) Foreign Application Priority Data

Dec. 11, 2023 (JP) ................................ 2023-208567

(51) Int. Cl.
*B60Q 5/00* (2006.01)
*G06V 20/58* (2022.01)
*G06V 40/20* (2022.01)

(52) U.S. Cl.
CPC ............ *B60Q 5/006* (2013.01); *G06V 20/58* (2022.01); *G06V 40/20* (2022.01)

(58) Field of Classification Search
CPC .......... B60Q 5/006; B60Q 9/00; G06V 20/58; G06V 40/20; G06V 10/82; G06V 20/59; A61H 3/061; A61F 9/08; B60R 1/23; B60R 16/023; B60R 2300/80
See application file for complete search history.

(56) References Cited

U.S. PATENT DOCUMENTS

2015/0243044 A1* 8/2015 Luo ........................ G06T 7/246 382/107
2019/0128694 A1 5/2019 Matsushita et al.
2023/0332912 A1* 10/2023 Buttolo .............. G01C 21/3461
2024/0182076 A1* 6/2024 Kim ....................... B60K 35/10

FOREIGN PATENT DOCUMENTS

JP 2015-007872 A 1/2015
JP 2018-160135 A 10/2018
JP 2019-078692 A 5/2019
JP 2022-061596 A 4/2022

* cited by examiner

*Primary Examiner* — Brian Wilson
(74) *Attorney, Agent, or Firm* — Dinsmore & Shohl LLP

(57) ABSTRACT

A ride support device includes a processor configured to: detect behavior of a visually impaired user who is about to enter a vehicle, based on an image generated by a camera configured to be capable of taking a picture of an entrance position of the vehicle, determine whether the detected behavior satisfies a collision prediction condition that the user is predicted to collide with the vehicle, and warn the user of a collision via a notification device provided on the vehicle, when the collision prediction condition is satisfied.

6 Claims, 5 Drawing Sheets

FIG. 6

RIDE SUPPORT DEVICE, METHOD, AND COMPUTER PROGRAM FOR SUPPORTING RIDE

CROSS-REFERENCE TO RELATED APPLICATIONS

This application claims priority to Japanese Patent Application No. 2023-208567 filed Dec. 11, 2023, the entire contents of which are herein incorporated by reference.

FIELD

The present disclosure relates to a ride support device, a method and a computer program for supporting a ride that supports a visually impaired person who is about to enter a vehicle.

BACKGROUND

A technique for smoothly guiding a visually impaired user to a dispatched driverless vehicle has been proposed (see Japanese Unexamined Patent Publication JP2019-78692A). A vehicle dispatch system disclosed in JP2019-78692A executes voice guidance processing for a visually impaired person when a user is determined to be visually impaired. The voice guidance processing includes processing for generating guidance information including a moving direction for the user to approach a driverless vehicle, based on the result of image recognition, and for informing the user of the guidance information by voice.

SUMMARY

When a visually impaired user is about to enter a vehicle, the user may bump part of his/her body against the vehicle body. It is therefore desirable to support a visually impaired user at entry into a vehicle so that the user does not collide with the vehicle body.

It is an object of the present disclosure to provide a ride support device that can support a visually impaired user at entry into a vehicle so that the user does not collide with the vehicle body.

As an embodiment of the present disclosure, a ride support device is provided. The ride support device includes a processor configured to: detect behavior of a visually impaired user who is about to enter a vehicle, based on an image generated by a camera configured to be capable of taking a picture of an entrance position of the vehicle, determine whether the detected behavior satisfies a collision prediction condition that the user is predicted to collide with the vehicle, and give the user a warning of a collision via a notification device provided on the vehicle, when the collision prediction condition is satisfied.

In an embodiment, the processor is further configured to tighten the collision prediction condition as the number of times the user rides in the vehicle without being given the warning of a collision increases.

In an embodiment, the processor is further configured to tighten the collision prediction condition when the ratio of the number of times the warning of a collision is given to the number of times the user rides in the vehicle in a most recent predetermined period falls below a predetermined threshold.

In an embodiment, the processor is further configured to relax the collision prediction condition as loudness around the vehicle increases.

In an embodiment, the processor predicts a trajectory of a predetermined body part of the user by detecting the predetermined body part from each of time-series images generated by the camera, determines a time to collision of the predetermined body part with a portion of the body of the vehicle other than an entrance of the vehicle, based on the predicted trajectory of the predetermined body part, and determines whether the collision prediction condition is satisfied, based on the time to collision.

According to another embodiment, a method for supporting a ride is provided. The method includes detecting behavior of a visually impaired user who is about to enter a vehicle, based on an image generated by a camera configured to be capable of taking a picture of an entrance position of the vehicle; determining whether the detected behavior satisfies a collision prediction condition that the user is predicted to collide with the vehicle; and warning the user of a collision via a notification device provided on the vehicle, when the collision prediction condition is satisfied.

According to still another embodiment, a non-transitory recording medium that stores a computer program for supporting a ride is provided. The computer program includes instructions causing a processor mounted on a vehicle to execute a process including detecting behavior of a visually impaired user who is about to enter the vehicle, based on an image generated by a camera configured to be capable of taking a picture of an entrance position of the vehicle; determining whether the detected behavior satisfies a collision prediction condition that the user is predicted to collide with the vehicle; and warning the user of a collision via a notification device provided on the vehicle, when the collision prediction condition is satisfied.

The ride support device according to the present disclosure has an effect of being able to support a visually impaired user at entry into a vehicle so that the user does not collide with the vehicle body.

BRIEF DESCRIPTION OF DRAWINGS

FIG. 6 is an operation flowchart of the ride support process.

DESCRIPTION OF EMBODIMENTS

A ride support device, a method, and a computer program for supporting a ride will now be described with reference to the attached drawings. The ride support device detects behavior of a visually impaired user who is about to enter a vehicle, based on an image generated by a camera configured to be capable of taking a picture of an entrance position of the vehicle. When the detected behavior satisfies a collision prediction condition that the user is predicted to collide with the vehicle, the ride support device warns the user of a collision via a notification unit provided on the vehicle.

Figure 1:
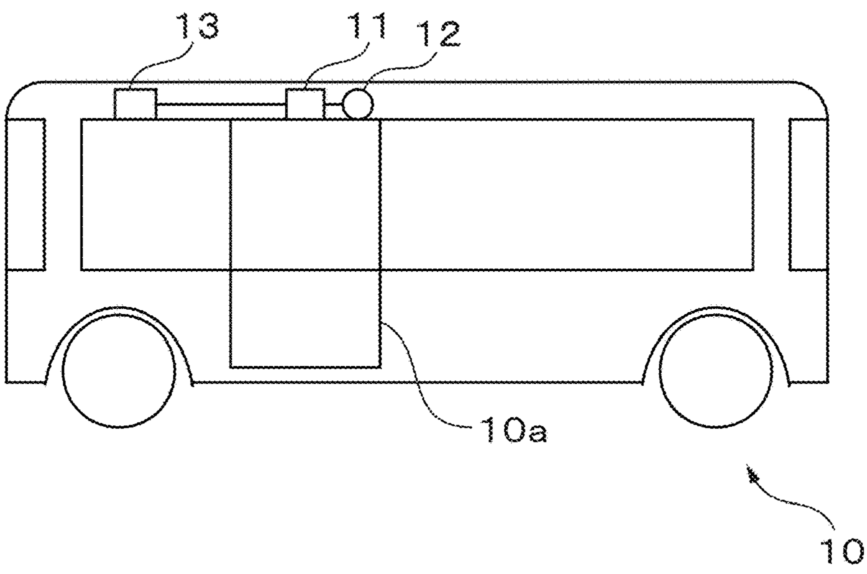
FIG. 1 schematically illustrates the configuration of a vehicle equipped with a ride support device according to an embodiment.

FIG. 1 schematically illustrates the configuration of a vehicle equipped with a ride support device according to an embodiment. The vehicle 10 equipped with a ride support device is a taxi, a bus, or a private car, and may be a vehicle under autonomous driving control. To this end, the vehicle 10 includes a vehicle exterior sensor (not illustrated) for obtaining information on the surroundings of the vehicle, a positioning device (not illustrated), a storage device (not illustrated) that stores map information, a wireless communication terminal (not illustrated), and an electron control unit (ECU, not illustrated). The vehicle 10 may further include a navigation device (not illustrated) that determines a travel route from the current position of the vehicle 10 to a destination. The vehicle exterior sensor, the positioning device, the storage device, the wireless communication terminal, and the navigation device are communicably connected to the ECU via an in-vehicle network (not illustrated) provided in the vehicle 10 and conforming to a predetermined standard. The vehicle exterior sensor may be, for example, a camera configured to take pictures of the surroundings to the vehicle, or a range sensor for detecting the distances to objects around the vehicle, such as radar or a LiDAR sensor. The positioning device is configured to measure the position of the vehicle, and includes, for example, a receiver that receives global positioning system (GPS) signals, and an operating circuit that calculates the position of the vehicle from the GPS signals. The wireless communication terminal has the function of wireless communication, and is configured to be communicable with another device outside the vehicle 10 via a wireless base station (not illustrated). The ECU executes autonomous driving control of the vehicle 10 so that the vehicle 10 travels along a planned travel route received via the wireless communication terminal or determined by the navigation device. For the purpose of autonomous driving control, the ECU refers to the position of the vehicle 10 measured by the positioning device, a sensor signal obtained by the vehicle exterior sensor and indicating conditions around the vehicle 10, and map information. In addition, the ECU executes control of components of the vehicle 10, such as control of opening and closing of a door provided on an entrance 10*a* of the vehicle 10. The entrance 10*a* is an example of an entrance position of the vehicle 10.

The vehicle 10 further includes a camera 11 configured to be capable of taking a picture of the entrance 10*a* of the vehicle 10 and its surroundings, a notification device 12 that can give predetermined notification to a user near the entrance by voice, and a ride support device 13. The camera 11 and the notification device 12 are communicably connected to the ride support device 13 via the in-vehicle network. The ride support device 13 may further be communicably connected to the ECU and the wireless communication terminal via the in-vehicle network.

The camera 11 is mounted, for example, above the entrance 10*a* of the vehicle 10 towards the bottom so that the area captured by the camera includes the entrance 10*a* and its surroundings, in particular, an exterior region near the entrance 10*a*. The camera 11 generates an image representing the entrance 10*a* and its surroundings every predetermined capturing period (e.g., 1/30 to 1/10 seconds). Images obtained by the camera 11 may be color or grayscale images. The vehicle 10 may be provided with multiple cameras 11 that can take pictures of the entrance 10*a* and its surroundings. When the vehicle 10 has multiple entrances, each entrance may be provided with a camera 11 that can take pictures of the entrance and its surroundings. Every time an image is generated, the camera 11 outputs the generated image to the ride support device 13 via the in-vehicle network.

The notification device 12 is, for example, a speaker, a buzzer, or a beeper, and outputs a voice representing predetermined notification, e.g., notification meaning a warning that a user's body is likely to collide with the body of the vehicle 10, according to a notification signal from the ride support device 13. To this end, the notification device 12 is mounted near the entrance 10*a* so that a user near the entrance 10*a* can catch the outputted voice when the entrance 10*a* is open.

The ride support device 13 executes a ride support process on a visually impaired user, based on an image generated by the camera 11.

Figure 2:
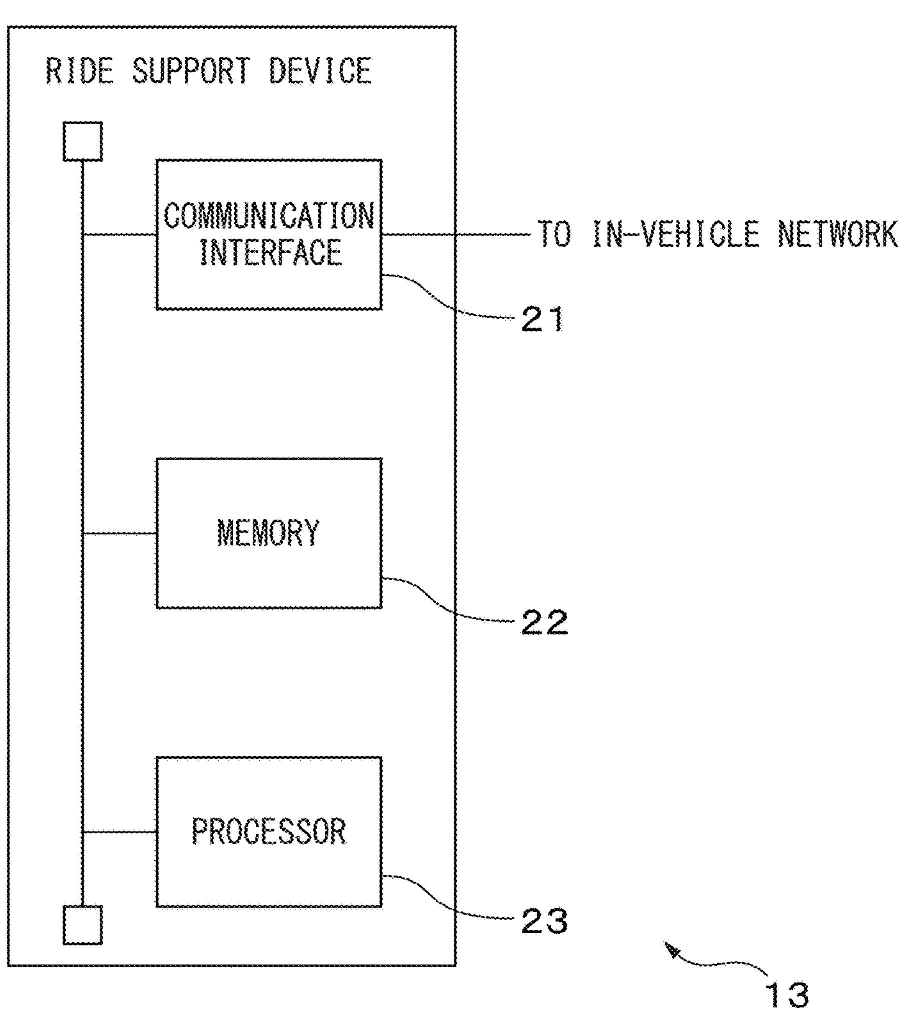
FIG. 2 schematically illustrates the configuration of the ride support device.

FIG. 2 illustrates the hardware configuration of the ride support device 13. As illustrated in FIG. 2, the ride support device 13 includes a communication interface 21, a memory 22, and a processor 23. The communication interface 21, the memory 22, and the processor 23 may be configured as separate circuits or a single integrated circuit.

The communication interface 21 includes an interface circuit for connecting the ride support device 13 to the in-vehicle network. Every time an image is received from the camera 11, the communication interface 21 passes the received image to the processor 23. When a notification signal to be outputted to the notification device 12 is received from the processor 23, the communication interface 21 outputs the notification signal to the notification device 12.

The memory 22, which is an example of a storage unit, includes, for example, volatile and nonvolatile semiconductor memories. The memory 22 stores various algorithms and various types of data used in a ride support process executed by the processor 23 of the ride support device 13. For example, the memory 22 stores private information and identifying information of a user, parameters for specifying a classifier used for detecting body parts of a user, and a warning threshold that defines a collision prediction condition. In addition, the memory 22 temporarily stores images received from the camera 11 and various types of data generated during the ride support process.

The processor 23 includes one or more central processing units (CPUs) and a peripheral circuit thereof. The processor 23 may further include another operating circuit, such as a logic-arithmetic unit, an arithmetic unit, or a graphics processing unit. When notified by the ECU that the door of the entrance 10*a* is opened, the processor 23 executes the ride support process.

Figure 3:
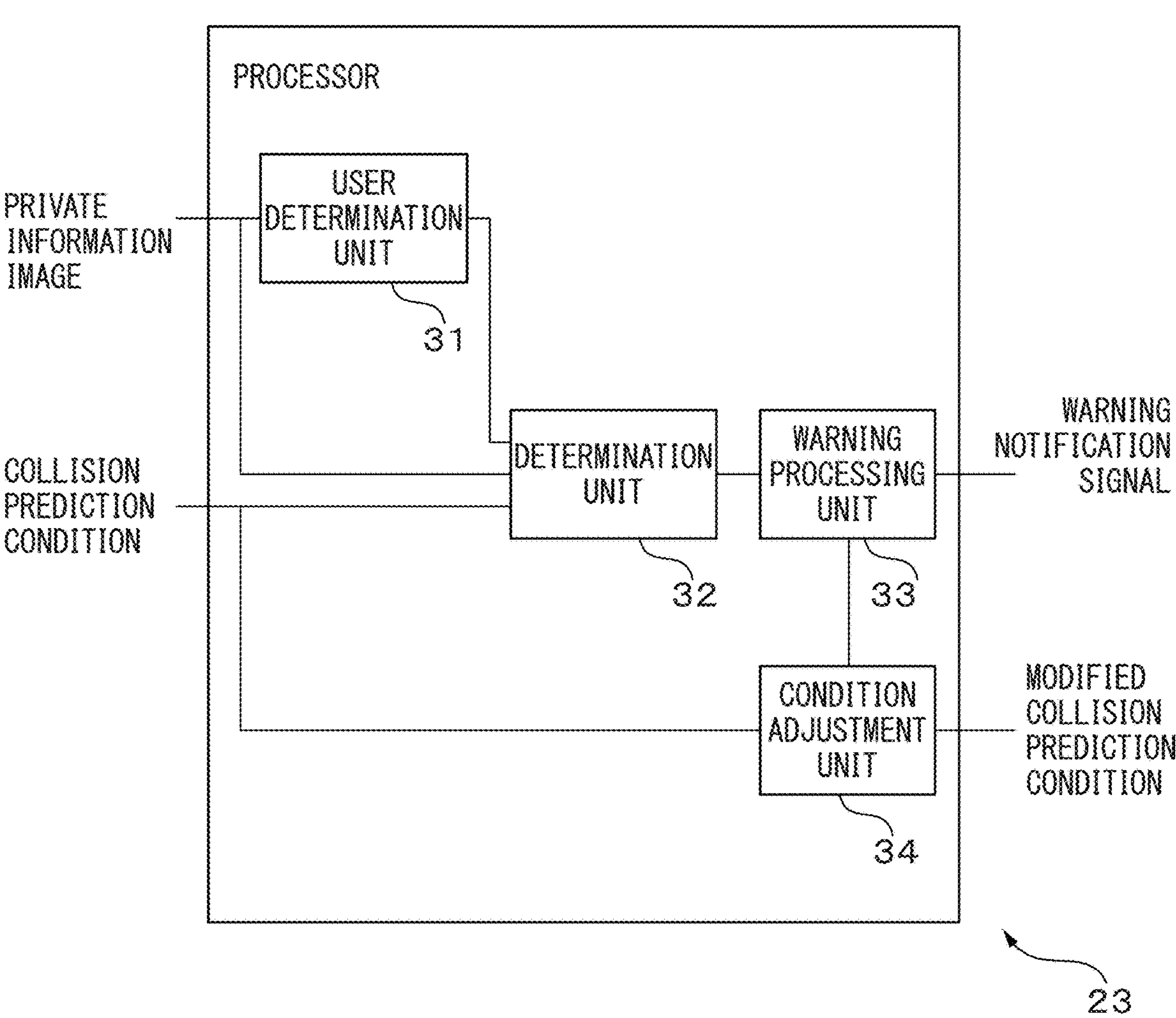
FIG. 3 is a functional block diagram of a processor related to a ride support process.

FIG. 3 is a functional block diagram of the processor 23 related to the ride support process. The processor 23 includes a user determination unit 31, a determination unit 32, a warning processing unit 33, and a condition adjustment unit 34. These units included in the processor 23 are functional modules, for example, implemented by a computer program executed by the processor 23, or may be dedicated operating circuits provided in the processor 23.

The user determination unit 31 determines whether a user who is about to enter the vehicle 10 is visually impaired. For example, when the vehicle 10 is a taxi, the vehicle 10 receives a pickup instruction including an expected location of a user's entry into the vehicle and private information on the user via the wireless communication terminal in some cases. When the vehicle 10 is a private car, private information on a user is registered in advance and stored in the memory 22 in some cases. In such cases, the user determination unit 31 refers to the private information. When the private information indicates that the user is visually impaired, the user determination unit 31 determines that the user who is about to enter the vehicle is visually impaired.

The user determination unit 31 may determine whether the user is visually impaired, based on an image obtained by the camera 11. In this case, the user determination unit 31 inputs an image into a classifier that has been trained to detect an implement carried by a visually impaired person (e.g., a white stick) or a guide dog. When such an implement or a guide dog is detected by the classifier from an image, the user determination unit 31 determines that the user is visually impaired. As such a classifier, one based on a "deep neural network (DNN)" is used. For example, a DNN having architecture of a convolutional neural network (CNN) type, such as Single Shot MultiBox Detector or Faster R-CNN, or a DNN having an attention mechanism, such as Vision Transformer, is used as such a classifier. Such a classifier is trained in advance with big data, such as a large number of training images, in accordance with a predetermined training technique, such as backpropagation, so as to detect a detection target from an image.

When the private information does not indicate that the user is visually impaired or when neither an implement carried by a visually impaired person nor a guide dog is detected from an image, the user determination unit 31 determines that the user is not visually impaired.

The user determination unit 31 notifies the determination unit 32 of the result of determination whether the user is visually impaired.

The determination unit 32 detects behavior of the user who is about to enter the vehicle 10, when the user is visually impaired. The determination unit 32 then determines whether the detected behavior satisfies a collision prediction condition that the user is predicted to collide with the vehicle 10.

In the present embodiment, the determination unit 32 inputs each of time-series images obtained by the camera 11 into a classifier that has been trained to detect one or more body parts of a user that may bump against the vehicle body near the entrance 10*a*, thereby detecting these body parts for each image. Examples of the one or more body parts of a user to be detected include a head, an arm, a hand, and a leg. The user's hand may be excluded from the body parts to be detected because the user may try to support his/her body by grasping a portion of the vehicle body intentionally. As the classifier, the determination unit 32 can use a DNN having CNN-type architecture or an attention mechanism, similarly to that used by the user determination unit 31. Alternatively, a classifier based on another machine learning algorithm, such as adaBoost or a support vector machine, may be used as such a classifier. Alternatively, the determination unit 32 may detect the user's body parts from each image, based on a detection technique other than machine learning, such as template matching. For each body part, the determination unit 32 detects time-series changes in the position of the body part as the trajectory of the body part, based on the positions of the body part detected from the respective images. For each detected body part, the determination unit 32 predicts a future trajectory of the body part, based on the trajectory of the body part. Specifically, the determination unit 32 applies a prediction filter, such as a Kalman filter, or extrapolates the trajectory of the detected body part to predict a future trajectory of the body part. For each body part, the determination unit 32 determines a time to collision TTC required for the predicted trajectory of the body part to reach a portion of the body of the vehicle 10 other than the entrance 10*a*, i.e., a position on the vehicle body near the entrance 10*a*. The time to collision TTC of each body part indicates the user's behavior. The shape of the vehicle body and the positions of components of the vehicle body in an image coordinate system viewed from the camera 11 are stored in advance. The determination unit 32 sets TTC of a body part whose predicted trajectory does not reach any position on the vehicle body to $\infty$.

The determination unit 32 may sequentially input time-series images obtained from the camera 11 into a classifier that has been trained to predict a time to collision for each body part of a user, thereby determining a time to collision TTC for each body part, based on the obtained time-series images. In this case, for example, a recurrent neural network (RNN) or a DNN having a recursive structure, such as Long Short-Term Memory (LSTM), is used as such a classifier.

The determination unit 32 calculates the sum of the products of the inverses of TTC calculated for the respective body parts and predetermined weighting factors as a collision prediction score. Alternatively, the determination unit 32 may use the maximum of the inverses of TTC calculated for the respective body parts as a collision prediction score. When the collision prediction score is not less than the warning threshold, the determination unit 32 determines that the collision prediction condition is satisfied. When the collision prediction score is less than the warning threshold, the determination unit 32 determines that the collision prediction condition is not satisfied. When the user can be identified, i.e., when the user's private information is stored in advance or can be received via the wireless communication terminal, the determination unit 32 reads out a warning threshold associated with the user's identifying information that matches the identifying information included in the private information from the memory 22 and uses this warning threshold.

When the collision prediction condition is satisfied, the determination unit 32 notifies the warning processing unit 33 of this fact and the body part whose time to collision TTC is the smallest. When a warning continuation condition, which is stricter than the collision prediction condition, is no longer satisfied after the collision prediction condition is temporarily satisfied, the determination unit 32 may notify the warning processing unit 33 of this fact. In the present embodiment, when the collision prediction score falls below a stop threshold, which is less than the warning threshold, the determination unit 32 determines that the warning continuation condition is no longer satisfied.

When multiple cameras 11 are provided near the entrance 10*a*, the determination unit 32 executes the above-described determination process for each of the cameras 11, based on images obtained by the camera.

When the user who is about to enter the vehicle 10 is visually impaired, the determination unit 32 may further detect that the user has entered the vehicle 10, based on an image obtained by the camera 11. For example, in the case where the position of each body part of the user detected from an image indicates that the body part is inside the vehicle 10, and where the ride support device 13 is notified by the ECU that the door is closed, the determination unit 32 determines that the user has entered the vehicle. Alternatively, in the case where the ECU detects the user's entry, based on a sensor signal obtained by another sensor provided in the vehicle interior, e.g., a camera for monitoring the vehicle interior or a seat sensor, the determination unit 32 determines that the user has entered the vehicle, when the ride support device 13 is notified by the ECU of a signal indicating the user's entry.

When the user can be identified, the determination unit 32 stores the date and time when it is determined that the user has entered the vehicle (hereafter the "date and time of riding") in the memory 22 in association with the user's private information.

The warning processing unit 33 warns the user of a collision via the notification device 12 by voice, when notified by the determination unit 32 that the collision prediction condition is satisfied. Specifically, the warning processing unit 33 causes the notification device 12 to output a message warning a collision by voice. Alternatively, the warning processing unit 33 may cause the notification device 12 to output a predetermined alarm indicating a warning of a collision. The warning processing unit 33 may further cause the notification device 12 to output a message about the body part whose time to collision TTC is the smallest (e.g., "Pay attention to your head, please") by voice. When there are supposed to be other passengers besides the user who is about to enter the vehicle, e.g., when the vehicle 10 is a bus, the warning processing unit 33 may further notify the passengers of a voice message asking them to support the user's entry, via the notification device 12. In the case where the user is identified (e.g., where the vehicle 10 is a private car or where a pickup instruction including private information is received by the vehicle 10), upon warning of a collision, the warning processing unit 33 stores the date and time when this warning is given (hereafter simply the "date and time of warning") in association with the user's private information stored in the memory 22.

The warning processing unit 33 stops notification of warning after a predetermined time from the start of warning of a collision or from when notified by the determination unit 32 that the warning continuation condition is no longer satisfied. The warning processing unit 33 may stop notification of warning when the user's entry into the vehicle 10 is detected by the determination unit 32.

Figure 4:
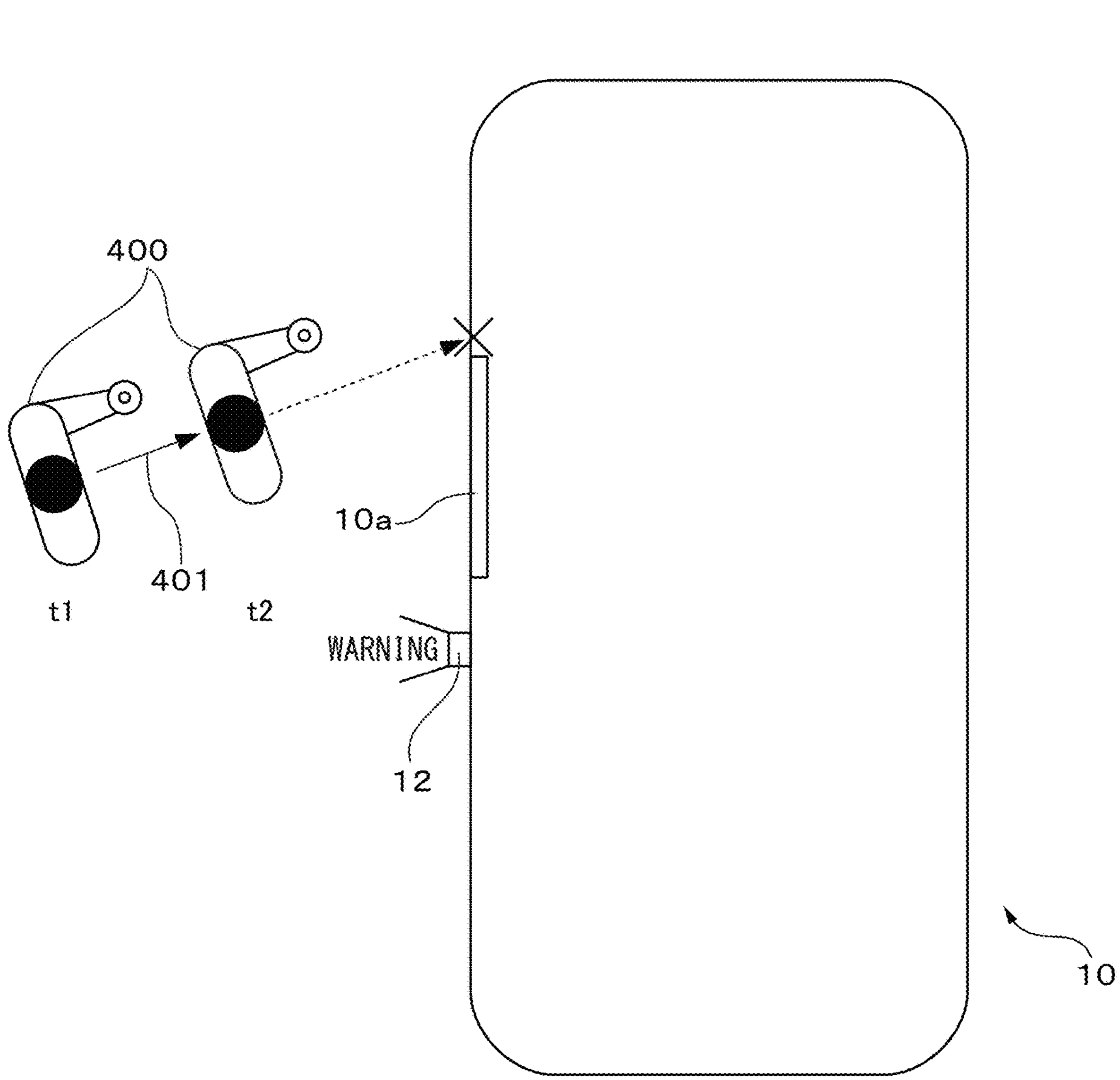
FIG. 4 is a diagram for briefly describing the ride support process according to the embodiment.

FIG. 4 is a diagram for briefly describing the ride support process according to the present embodiment. In this example, a user 400 is predicted to collide with the body of the vehicle 10 near the entrance 10*a* of the vehicle 10, based on behavior 401 of the user 400 from time t1 to time t2, and the collision predicted value is greater than the warning threshold. The user 400 will thus be warned of a collision via the notification device 12.

The condition adjustment unit 34 adjusts the collision prediction condition, depending on the user, when the user can be identified. For example, when the vehicle 10 is the user's private car, the user is supposed to be a particular person. When a pickup instruction including private information is received by the vehicle 10, the condition adjustment unit 34 can also identify the user. In such cases, the condition adjustment unit 34 refers to the dates and times of warning and the dates and times of riding associated with the private information. The condition adjustment unit 34 then modifies the collision prediction condition so as to tighten the collision prediction condition as the number of consecutive warning-free rides, which is the number of consecutive times the user rides in the vehicle 10 without being warned of a collision, increases. In other words, the condition adjustment unit 34 increases the warning threshold with the number of consecutive warning-free rides. This makes a user who is used to ride in the vehicle 10 unlikely to be warned of a collision, reducing the user's annoyance. In this way, an appropriate warning threshold can be set, depending on the user. The upper limit of the warning threshold may be set in advance. More specifically, the condition adjustment unit 34 may set the warning threshold to its upper limit so as not to increase it any longer, when the number of consecutive warning-free rides reaches a certain number.

According to a modified example, the condition adjustment unit 34 may count the dates and times of riding and the dates and times of warning included in a most recent predetermined period to determine the number of rides and the number of times of warning in the predetermined period. The condition adjustment unit 34 may then tighten the collision prediction condition when the ratio of the number of times of warning to the number of rides falls below a predetermined threshold.

The condition adjustment unit 34 may modify the collision prediction condition so as to relax the collision prediction condition, i.e., to reduce the warning threshold, upon a warning of a collision at the user's entry at a certain time. This prevents too strict setting of the collision prediction condition causing the user not to be warned appropriately. Alternatively, the condition adjustment unit 34 may modify the collision prediction condition so as to relax the collision prediction condition as the number of days that have elapsed since the user's last ride in the vehicle 10 increases. This enables an appropriate warning of a collision even if the user has forgotten how to manage to enter the vehicle 10. The lower limit of the warning threshold may be set in advance. More specifically, the condition adjustment unit 34 may set the warning threshold to its lower limit so as not to decrease it any longer, when a certain number of days have elapsed since the last ride.

The condition adjustment unit 34 stores the modified collision prediction condition in the memory 22 in association with the user's private information.

Figure 5:
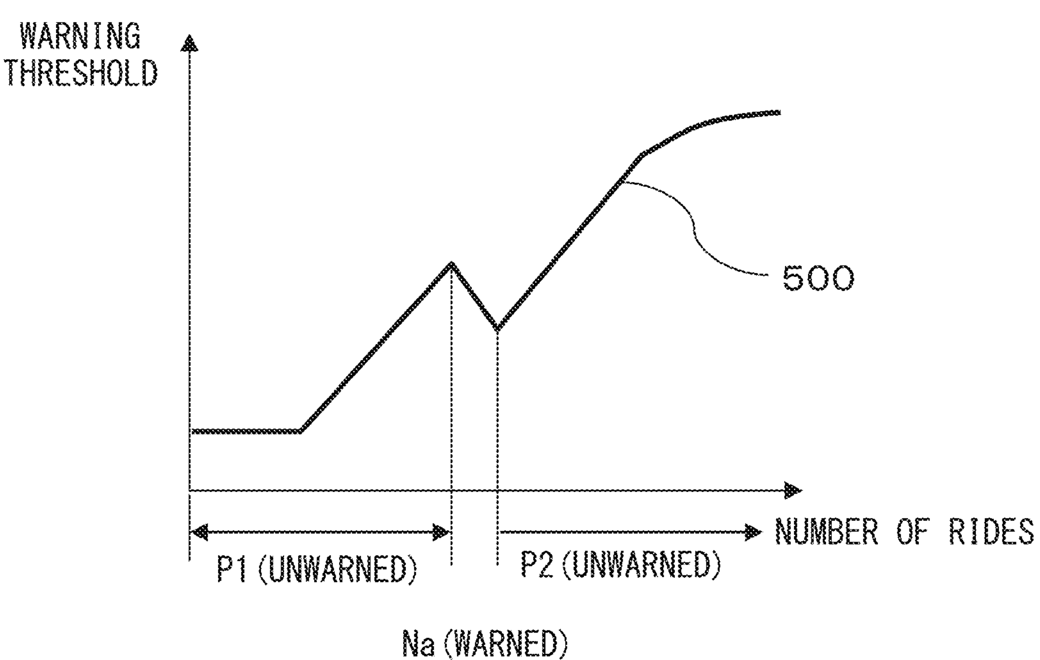
FIG. 5 illustrates an example of changes in a warning threshold, which is an example of the collision prediction condition.

FIG. 5 illustrates an example of changes in the warning threshold, which is an example of the collision prediction condition. In FIG. 5, the abscissa represents the number of rides of the user, and the ordinate represents the warning threshold. The graph 500 represents changes in the warning threshold, depending on the number of rides. In this example, in a period P1, the user repeatedly rides in the vehicle 10 without being warned. Thus the condition adjustment unit 34 increases the warning threshold with the number of rides. In other words, the collision prediction condition is tightened. Then, a warning of a collision is given when the user rides in the vehicle 10 for the Na-th time. Thus the condition adjustment unit 34 reduces the warning threshold by a predetermined amount at the user's next ride in the vehicle 10 after the Na-th ride. Thereafter, in a period P2, the user repeatedly rides in the vehicle 10 again without being warned, and thus the condition adjustment unit 34 increases the warning threshold with the number of consecutive warning-free rides.

Figure 6:
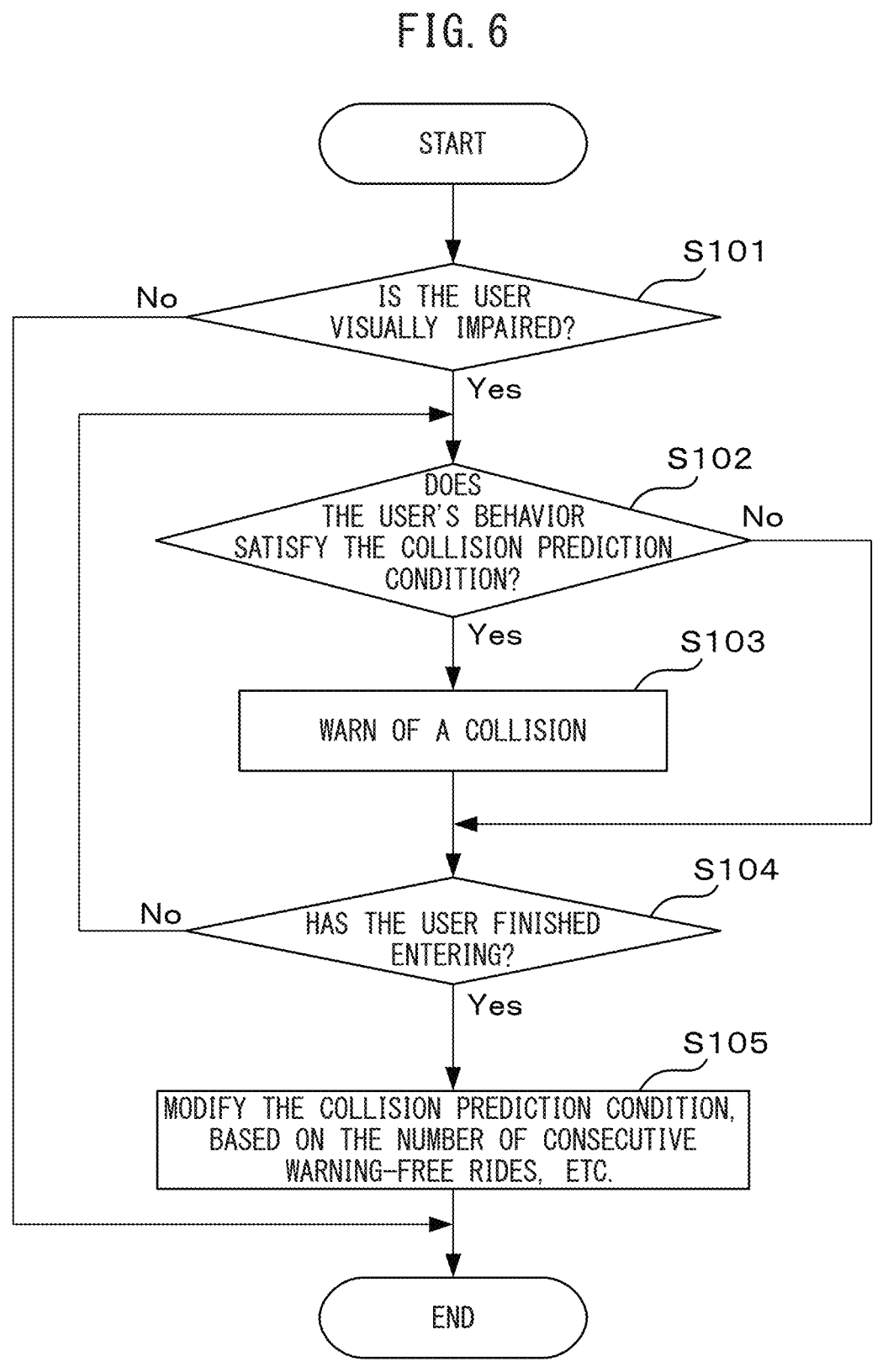

FIG. 6 is an operation flowchart of the ride support process. Every time a user is about to enter the vehicle 10, the processor 23 executes the ride support process in accordance with the operation flowchart described below, for example, upon notification by the ECU that the door of the entrance 10*a* is opened.

The user determination unit 31 of the processor 23 determines whether the user who is about to enter the vehicle 10 is visually impaired (step S101). When the user is not visually impaired (No in step S101), the processor 23 terminates the ride support process. When the user is visually impaired (Yes in step S101), the determination unit 32 of the processor 23 detects the user's behavior, and determines whether the user's behavior satisfies the collision prediction condition (step S102). When the user's behavior satisfies the collision prediction condition (Yes in step S102), the warning processing unit 33 of the processor 23 warns the user of a collision with the body of the vehicle 10 via the notification device 12 (step S103).

After step S103 or when the user's behavior does not satisfy the collision prediction condition in step S102 (No in step S102), the determination unit 32 determines whether the user has finished entering the vehicle 10 (step S104). When the user has not finished entering (No in step S104), the processor 23 repeats the processing of step S102 and the subsequent steps. When the user has finished entering (Yes in step S104), the condition adjustment unit 34 of the processor 23 modifies the collision prediction condition, based on, for example, the number of consecutive warning-free rides (step S105). The processor 23 then terminates the ride support process.

As has been described above, the ride support device detects behavior of a visually impaired user who is about to enter a vehicle. When the detected behavior satisfies the collision prediction condition, the ride support device warns the user of a collision via a notification unit provided on the vehicle. Thus the ride support device can support a visually impaired user at entry into a vehicle so that the user does not collide with the vehicle body.

According to a modified example, the collision prediction condition may be set stricter when the vehicle 10 is a private car possessed by a user than when the vehicle 10 is a bus or a taxi. When the vehicle 10 is a private car possessed by a user, the user's body will be unlikely to collide with the body of the vehicle 10 at entry into the vehicle 10 because the user is used to ride in the vehicle 10. Thus the user's annoyance is reduced by setting the collision prediction condition as described above.

According to another modified example, the condition adjustment unit 34 may adjust the collision prediction condition, depending on the circumstances of the vehicle 10 at the user's entry into the vehicle 10. For example, it is more difficult for a visually impaired user to rely on sound information, which is important to the user, as the surroundings of the vehicle are noisier. This makes it difficult for the user to grasp the positional relationship between him/her and the vehicle 10. Thus the condition adjustment unit 34 relaxes the collision prediction condition, i.e., decreases the warning threshold as loudness around the vehicle 10 at the user's entry into the vehicle 10 increases. Alternatively, the warning processing unit 33 may increase the volume of warning outputted from the notification device 12 with the loudness around the vehicle 10 at the user's entry into the vehicle 10. The condition adjustment unit 34 (or the warning processing unit 33; the following describes only the condition adjustment unit 34 as a representative) measures the loudness around the vehicle 10, based on voices collected with a microphone provided on the vehicle 10 when the door of the entrance 10*a* is open. Alternatively, the condition adjustment unit 34 may determine whether an object that may make a loud noise is represented in an image generated by the camera 11 or another camera for taking pictures of the surroundings of the vehicle 10. When such an object is represented, the condition adjustment unit 34 may determine that the loudness around the vehicle 10 is great enough to prevent the user's entry into the vehicle 10, and set the collision prediction condition less strict than usual (i.e., than when the loudness around the vehicle 10 does not prevent the user's entry into the vehicle 10). Such an object may be, for example, an emergency vehicle, a portable shrine for a festival, or rain exceeding a predetermined amount. The condition adjustment unit 34 determines whether such an object is represented in an image by inputting the image into a classifier that has been trained to detect such an object. As such a classifier, the condition adjustment unit 34 can use a CNN or a DNN having an attention mechanism. Alternatively, the condition adjustment unit 34 may determine that it is raining more than a predetermined amount, when the operating mode of a windshield wiper of the vehicle 10 is such that the wiper operates faster than a predetermined speed or when a value sensed by a rainfall sensor provided on the vehicle 10 indicates that the rainfall is more than the predetermined amount. When determining that it is raining more than a predetermined amount, the condition adjustment unit 34 may set the collision prediction condition less strict than usual.

When a visually impaired user rides in the vehicle with a person who supports the user's entry (hereafter a "caregiver"), such as a family member or a friend, the user may feel a warning of a collision annoying because support for entry is available. Thus, when the user rides in the vehicle 10 with a caregiver, the condition adjustment unit 34 may set the collision prediction condition stricter, i.e., set the warning threshold higher than when the user rides in the vehicle 10 alone. This reduces the user's annoyance at a warning of a collision.

In the case where the vehicle 10 is a taxi and where the expected number of riding people included in a pickup instruction is two or more, the condition adjustment unit 34 may determine that the user will ride in the vehicle 10 with a caregiver. Alternatively, the condition adjustment unit 34 may determine whether a person represented with the user in images obtained by the camera 11 at the user's past ride in the vehicle 10 (hereafter "past images") is the same as one represented with the user in images obtained by the camera 11 when the user is about to ride in the vehicle 10 at present (hereafter "current images"). When the person represented with the user in the past images is the same as the one represented with the user in the current images, the condition adjustment unit 34 may determine that the user will ride in the vehicle 10 with a caregiver. In this case, the condition adjustment unit 34 detects the persons represented in the past and current images, and determines whether the detected persons are the same. To this end, the condition adjustment unit 34 inputs the past and current images into a classifier that has been trained to detect a person represented in an image, thereby detecting persons represented in the images. As such a classifier, the condition adjustment unit 34 can use a CNN or a DNN having an attention mechanism. The condition adjustment unit 34 then determines whether the persons represented in the past and current images are the same, in accordance with a predetermined technique for determining matching.

The computer program causing a computer to execute the above-described process executed by the processor 23 of the ride support device 13 may be distributed, for example, in a form recorded on a storage medium such as an optical medium or a magnetic medium.

As described above, those skilled in the art may make various modifications according to embodiments within the scope of the present disclosure.

What is claimed is:

1. A ride support device comprising:

a processor configured to:

detect behavior of a visually impaired user who is about to enter a vehicle, based on an image generated by a camera configured to be capable of taking a picture of an entrance position of the vehicle, determine whether the detected behavior satisfies a collision prediction condition that the user is predicted to collide with the vehicle, give the user a warning of a collision via a notification device provided on the vehicle, when the collision prediction condition is satisfied, and tighten the collision prediction condition as the number of times the user rides in the vehicle without being given the warning increases.

2. The ride support device according to claim 1, wherein the processor is further configured to tighten the collision prediction condition when the ratio of the number of times the warning is given to the number of times the user rides in the vehicle in a most recent predetermined period falls below a predetermined threshold.

3. The ride support device according to claim 1, wherein the processor is further configured to relax the collision prediction condition as loudness around the vehicle increases.

4. The ride support device according to claim 1, wherein the processor predicts a trajectory of a predetermined body part of the user by detecting the body part from each of time-series images generated by the camera, determines a time to collision of the body part with a portion of the body of the vehicle other than an entrance of the vehicle, based on the predicted trajectory of the body part, and determines whether the collision prediction condition is satisfied, based on the time to collision.

5. A method for supporting a ride, comprising:

detecting behavior of a visually impaired user who is about to enter a vehicle, based on an image generated by a camera configured to be capable of taking a picture of an entrance position of the vehicle;

determining whether the detected behavior satisfies a collision prediction condition that the user is predicted to collide with the vehicle;

warning the user of a collision via a notification device provided on the vehicle, when the collision prediction condition is satisfied; and tightening the collision prediction condition as the number of times the user rides in the vehicle without being given the warning increases.

6. A non-transitory recording medium that stores a computer program for supporting a ride, the computer program causing a processor mounted on a vehicle to execute a process comprising:

detecting behavior of a visually impaired user who is about to enter the vehicle, based on an image generated by a camera configured to be capable of taking a picture of an entrance position of the vehicle;

determining whether the detected behavior satisfies a collision prediction condition that the user is predicted to collide with the vehicle;

warning the user of a collision via a notification device provided on the vehicle, when the collision prediction condition is satisfied; and tightening the collision prediction condition as the number of times the user rides in the vehicle without being given the warning increases.

* * * * *